Jan. 11, 1955
D. E. SAFFORD
2,699,060
CATALYST TESTING APPARATUS
Filed Jan. 7, 1954
2 Sheets-Sheet 2
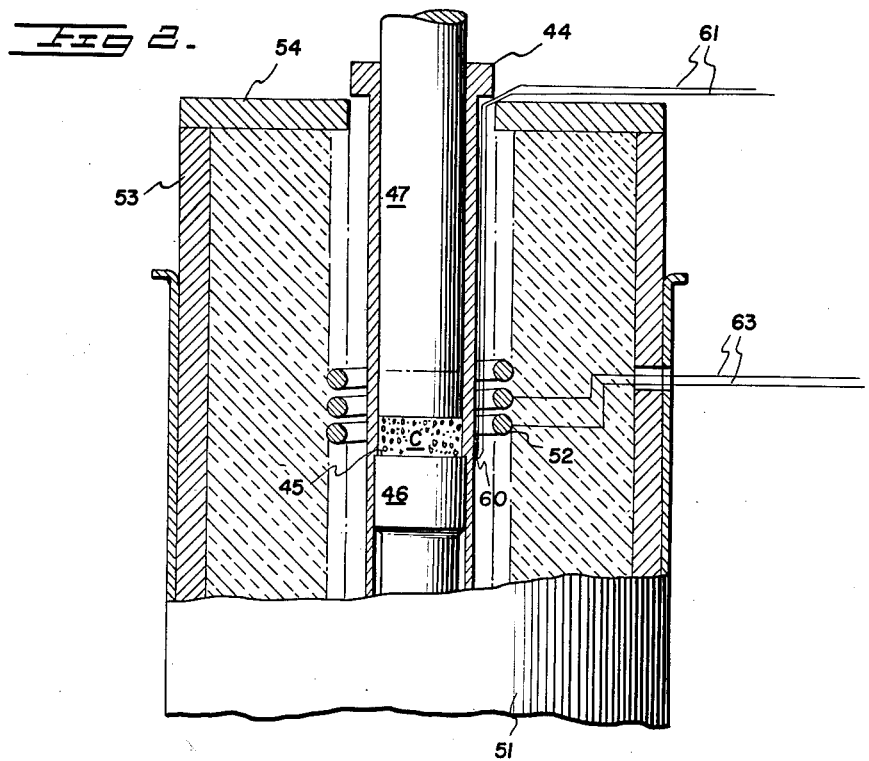
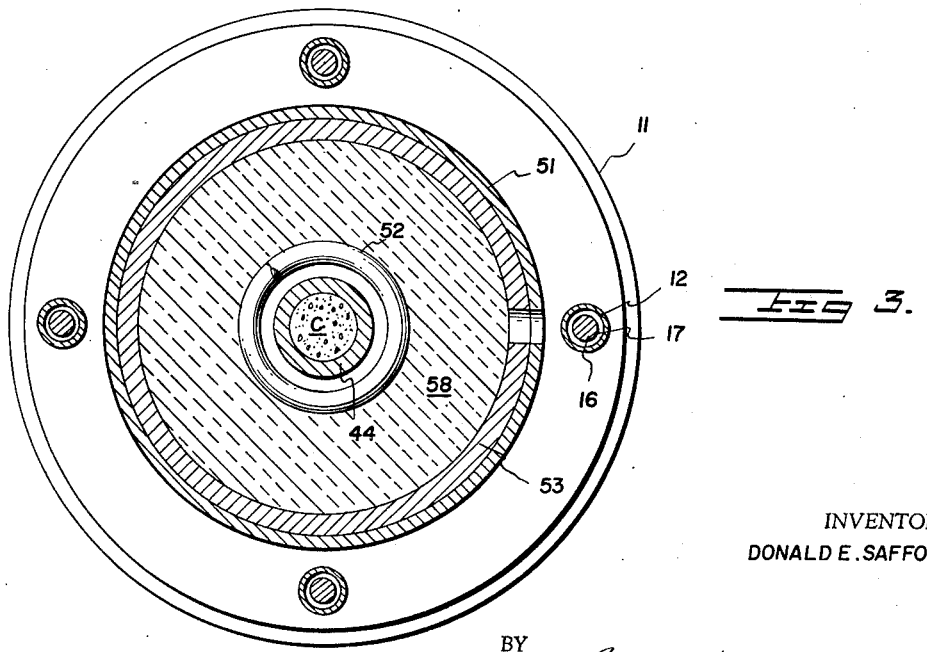
INVENTOR
DONALD E. SAFFORD
BY
Adams, Forward and McLean
ATTORNEYS United States Patent Office 2,699,060
Patented Jan. 11, 1955

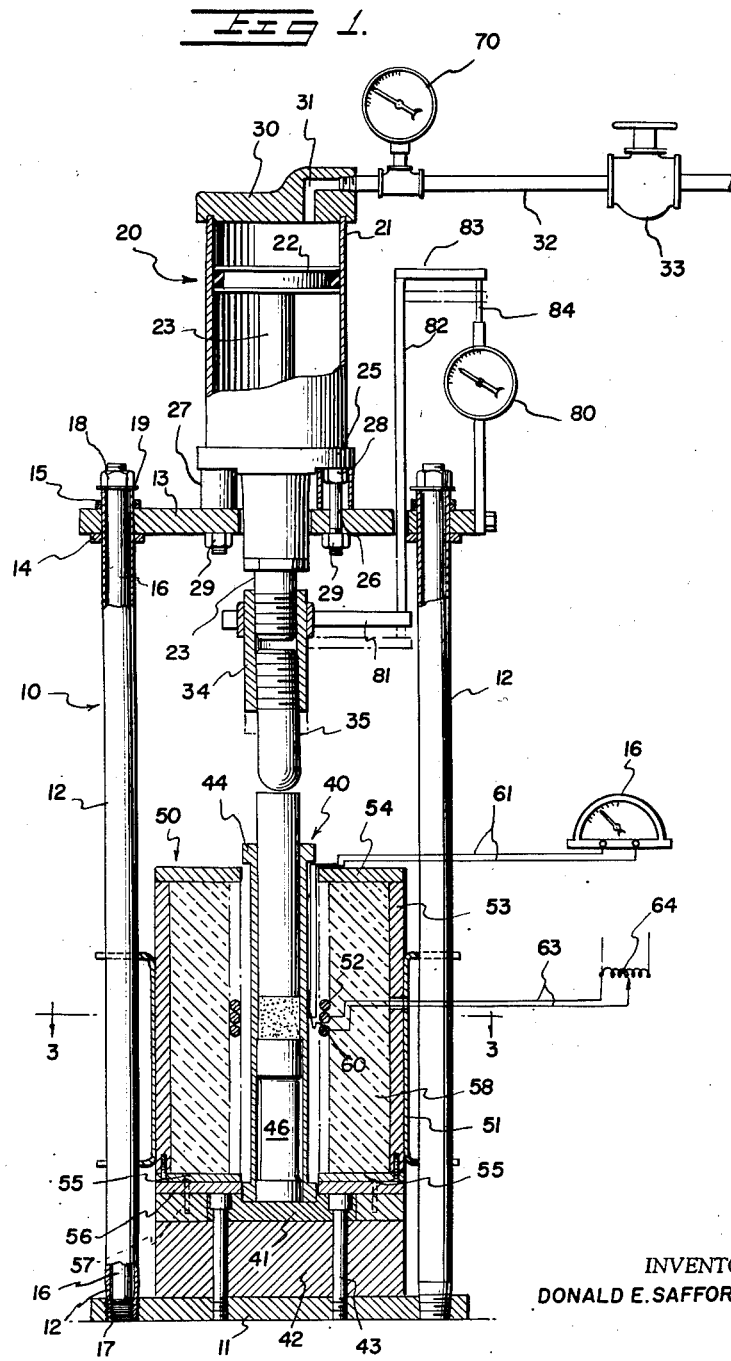

2,699,060

CATALYST TESTING APPARATUS

Donald E. Safford, Dyer, Ind., assignor to Sinclair Refining Company, New York, N. Y., a corporation of Maine Application January 7, 1954, Serial No. 402,760

1 Claim. (Cl. 73—15.4)

This invention relates to the measurement and determination of the physical properties of bead, pelleted or extruded catalyst under simulated operating conditions wherein a representative sample of the catalyst is tested. This invention, in particular, provides an apparatus for performing compaction tests upon a representative sample of catalyst particles, wherein deflection (compaction) and crushing strength of the catalyst is determined at any desired temperatures and pressures simulating those actually existing in catalytic reactor and regenerator units.

In the preparation of bead, pelleted or extruded catalyst of synthetic or natural origin, there exists a definite problem of determining the ability of the catalyst to stand up under the temperatures and pressures present in the operation for which the catalyst is designed. Deflection or compaction of the catalyst is particularly important from the standpoint of pressure drop through, and change in volume of, a catalyst bed in commercial use. Catalyst crushing strength is important in the determination of the maximum bed height which may be employed with no catalyst crushing and also in the determination of the minimum catalyst crushing for a given bed height. Minimum catalyst crushing strength is particularly important in determining the maximum degree of porosity and consequently the minimum proportion of binder required. Both of the last factors are important in achieving maximum catalyst activity. There must, at the same time, be assurance that a catalyst of minimum strength will not be crushed causing undue loss of catalyst in the form of fines and increasing the pressure drop through the catalyst bed.

Crushing strength and compaction determinations of catalyst of bead, pelleted or extruded particle form has heretofore been checked by inadequate methods involving selection of a single particle at random. Such methods are inaccurate and therefore undesirable. The particles selected, for example, may be either in the high or the low range of crushing strength and need not necessarily be representative. The presently available testing equipment is, moreover, incapable of adequate simulation of commercial operating temperatures and pressures.

I have found that the objections to prior catalyst compaction testing apparatus can be avoided by placing a quantity of catalyst of sufficient size to insure representative sampling within an elongated open ended cylinder between cooperating faces of a pair of pistons positioned in the cylinder. By placing the pistons between the relatively movable members of a press and by heating the entire length of the cylinder, almost any desired operating condition may be adequately simulated on the representative sample of catalyst. Deflection (compaction) is then simply a function of the relative positions of the press members. Pressure can be directly measured where the press is operated by fluid pressure based upon a knowledge of the pressure within the cylinder powering the press. Temperature measurement within the catalyst itself can be taken by placing a thermocouple or other suitable temperature measuring element at the central portion of the open ended cylinder.

The apparatus of this invention broadly includes a catalyst holding cylinder and cooperating piston assembly suitably positioned in upright position upon the bed plate of a vertical press, wherein a movable press member, together with its actuating cylinder and piston, is supported above the catalyst holding cylinder and piston assembly so positioned that the movable press member engages the upper piston in the catalyst holding cylinder. A heating mantle is slidably mounted on the press frame and removably positioned about the catalyst holding cylinder.

The load imposed upon the piston by the movable press member is thus imposed on the catalyst sample retained within the central portion of the catalyst holding cylinder between the cooperating faces of the pistons located therein. The catalyst can be uniformly heated by the heating mantle to any desired commercial operating temperature and yet the heating mantle can be removed for immediate access to the catalyst sample holding assembly. A load indicator can be connected in communication with the fluid pressure powering the press, i. e., in the fluid conduit leading to the cylinder of the press. A deflection indicator can be suitably positioned to measure the relative position of the movable press member with respect to some fixed part of the press. Temperature measurements can be made by placing a temperature measuring element on the central portion of the catalyst holding cylinder.

As broadly outlined, it will be seen the device is not only useful for determining catalyst deflection at any desired pressure and temperature, but that the device can be utilized to determine minimum crushing pressures, maximum catalyst crushing strength, and changes of all such catalyst properties upon aging under operating conditions. The device can even simulate transfer operations wherein catalyst is cycled from a reactor to a regenerator and back by program control of the heating mantle and of the load imposed by the press.

For a more complete understanding of the principles of my invention, reference is made to the appended drawings of which the following is a description:

Figure 1 is a partially sectioned elevational view of a catalyst compaction testing device constructed in accordance with the principles of this invention;

Figure 2 is a fragmentary enlarged partially sectioned elevational view of the device shown in Figure 1 illustrating more clearly the manner in which catalyst is confined and compacted within the central portion of an elongated cylinder between the cooperating faces of a pair of pistons in such cylinders; and Figure 3 is an enlarged cross-sectional view of the device shown in Figure 1 taken at line 3—3 in Figure 1.

The apparatus illustrated in the drawings includes a vertical press 10, powering means 20, a catalyst-holding assembly 40 and heating mantle 50, together with suitable temperature, pressure and deflection indicating instruments.

Press 10 is formed on a circular bed plate 11 and is supported by means of four pre-stressed tie rods 12, which are vertically positioned on and spaced at equal arcuate intervals about the periphery of circular bed plate 11. Tie rods 12 support cross head 13 at their upper extremities. Each tie rod 12 is a hollow cylindrical tube which threadedly engages a tapped opening in bed plate 11 and extends through a correspondingly positioned opening in cross head 13. Cross head 13 is also a circular plate similar to bed plate 11, but is further provided with a central opening, the purpose of which will be hereinafter described. Each tie rod 12 is provided with a flange 14 welded thereto near its upper end to form a support for cross head 13. A pair of lock nuts 15, threadedly engaging the upper end of each tie rod 12, hold cross head 13 firmly upon each flange 14.

Tie rods 12 are pre-stressed, in order to minimize erroneous deflection readings, by means of tension rods 16 which pass lengthwise through tie rods 12 and which are secured to the lower ends of tie rods 12 by threadedly engaging the tapped inner surface of a nipple 17 threadedly engaged with the tapped inner surface of tie rod 12 at its lower extremity. Tension is placed upon rods 16 by tightening nuts 18 threadedly engaging the upper end of each tension rod 16 and bearing on the upper end of each tie rod 12 through washer 19.

Cross head 13 supports the power cylinder assembly 20 of press 10. The power cylinder assembly 20 includes power cylinder 21, piston 22 located therein and piston rod 23 which extends downwardly through a packed gland 24 mounted on the lower end 25 of cylinder 21. Gland 24 passes through the central opening in cross head 13 to which reference was made hereinbefore.

Assembly 20 is supported upon cross head 13 by studs 26 and hollow cylindrical posts 27. Each stud 26 passes through an appropriate opening in cross head 13, threadedly engages a tapped opening in the under surface of the lower end 25 of cylinder 21 and is secured in such position by means of lock nut 28. Posts 27, passed over studs 26, rest between the under surface of cylinder end 25 and the upper surface of cross head 13. Nuts 29 threadedly engaging the lower ends of studs 26 and bearing upwardly against the under surface of cross head 13 are utilized to secure assembly 20 upon cross head 13.

The upper end 30 of cylinder 21 is provided with opening 31 for admission of fluid pressuring medium, such as air, supplied by a suitable conduit 32 having a pressure reducing valve 33 for controlling the pressure therein.

The lower end of piston rod 23 is threaded to receive tapped sleeve 34, into the lower end of which plunger 35 is threadedly engaged.

Catalyst holding assembly 40 is supported on bed plate 11 which includes plate 41, secured by bolts 42 to bed plate 11 and resting on interposed block 43. Plate 41 is provided with a central circular recess in its upper surface into which the lower end of elongated open ended cylinder 44 is removably positioned. The central recess in plate 41 properly aligns the upper end of cylinder 44 with plunger 35.

Cylinder 44 has a central bore passing therethrough. Suitably the bore in cylinder 44 has a slightly greater diameter in the lower end than in the upper end thereby providing an internal shoulder 45. Piston 46, having a swaged middle portion, fits slidably within the lower end of cylinder 44 up to a snug fit with shoulder 45 when cylinder 44 is positioned on plate 41. A second piston 47 slidably fits within the upper end of cylinder 44 and its upper end, which is aligned with the lower end of plunger 35, is provided with a surface complementary to the lower surface of plunger 35. The upper surface of piston 46 and the lower surface of piston 47 define a catalyst test zone C within the central portion of cylinder 44.

Heating mantle assembly 50 is slidably mounted on tie rods 12 in cylindrical retainer 51 which is provided with holes in its flanged upper and lower ends through which tie rods 12 pass. Heating mantle 50 is of annular cylindrical shape having a central opening which will clear cylinder 44, plunger 35 and sleeve 34 as assembly 50 slides along tie rods 12 from a lower to an upper position thereon.

A heavy duty radiant heater coil 52 is positioned vertically within heating mantle assembly 50 about its central opening and extends the length of heating mantle 50 which is substantially equal to the length of cylinder 44. Coil 52 is connected by electrical leads 63 to a suitable adjustable power source such as variable autotransformer 64. Coil 52 is held within retainer 51 by cylindrical box 53 which fits tightly within retainer 51. Box 53 has annular upper and lower ends 54 and 55 secured thereto which support coil 52 and at the same time retain insulating material 58 which is interposed between outer wall 53 and coil 52 in order to reduce the loss of heat from heating mantle 50. The lower end 55 of box 53 is reinforced by an additional bottom 56 to which is secured an annular member 57 forming a boss which, in the lower position of mantle 50, snugly fits about plate 41 and rests on block 43.

Thermocouple 60 is positioned on the wall of cylinder 44 at the central portion thereof close to catalyst zone C. Suitable electric connections 61 are utilized to connect thermocouple 60 to suitable potentiometric instrument such as millivolt-meter 62, preferably calibrated to read directly in degrees of temperature at thermocouple 60, and hence in catalyst zone C.

Pressure within catalyst zone C is measured indirectly by measuring the pressure of the fluid medium driving piston 22 within cylinder 21. Where air is the pressuring medium, such pressure measurements are made by inserting Bourdon gauge 70 in conduit 32 between cylinder head 30 and reducing valve 33. Gauge 70 is preferably calibrated to indicate directly the pressure within the catalyst zone C which is substantially the pressure in cylinder 21 multiplied by the ratio of the area of the upper surface of piston 22 to the cross sectional area of catalyst zone C.

Deflection measurements are suitably made by dial indicator 80 mounted on cross head 13. Beam 81, connected to sleeve 34, by appropriate extension arms 82 and 83 bears against the plunger actuating element 84 of indicator 80. Suitably, indicator 80 is provided with an adjustably positionable indicating dial which can be set by rotating a bezel or the like to indicate zero deflection at a desired base pressure indicated on pressure gauge 70.

In operating the device shown in Figures 1, 2 and 3, catalyst holding assembly 40 is removed from press 10 by sliding mantle 50 toward the upper end of the tie rods 12. Piston 46 is then placed in the lower end of cylinder 44 until it abuts shoulder 45. A sample of catalysts to be tested is placed on top of the upper face of piston 46 in any pre-determined quantity. In order to insure uniform testing, I have found it particularly desirable to scribe a line about piston 47, which, as piston 47 is slid on top of the catalyst sample, will be level with the upper end of cylinder 44 when the desired amount of catalyst has been placed between pistons 46 and 47 within cylinder 44. Such a scribed line greatly facilitates taking roughly uniform quantities of catalyst samples for each test, and also assures obtaining more consistent results of a number of tests on different catalyst samples.

Having placed the catalyst sample within cylinder 44 between pistons 46 and 47 these are then carefully replaced on plate 41 making sure that piston 46 does not juggle loose from its snug fit with shoulder 45. Heating mantle 50 is then slid down into position about cylinder 44 resting on block 43.

In a typical test, the catalyst is then brought up to testing temperature by adjusting transformer 64 in accordance with the reading obtained on thermocouple indicating meter 62. After the catalyst within zone C has reached the desired temperature, valve 33 is opened to permit air to flow into cylinder 21 and drive piston 22 and thus plunger 35, down so that plunger 35 at its lower end abuts the upper end of piston 47 and forces piston 47 downwardly against the catalyst sample within catalyst zone C.

Suitably, deflection indicator 80 is zeroed at some low desired base pressure at which plunger 35 just engages piston 47. Alternatively, however, indicator 80 can be zeroed with the catalyst zone empty to provide absolute rather than relative measurements.

Pressure is then increased in cylinder 21 in any desired increments. Linear travel of plunger 35 and therefore of piston 47 is transmitted through direct linkage 81, 82 and 83 to dial indicator 80 thus providing a measure of the compressive deformation of catalyst (compaction) corresponding to the pressure applied. Suitably, a number of pressure loads are applied in order to provide deflection indications from which stress-strain curves can be established for a particular catalyst.

I claim:

An apparatus for performing compaction tests upon bead, pelleted and extruded catalysts in representative samples which comprises a press having a fixed bed plate and a vertically movable press member mounted thereabove, an open-ended elongated cylinder removably and vertically positioned on said bed plate beneath and vertically aligned with said movable press member, a piston in the lower portion of said cylinder, a second piston slidably positioned in the upper portion of said cylinder vertically aligned with said movable press member, the upper face of said first piston and the lower face of said second piston cooperating within the central portion of said cylinder to define a chamber for receiving a sample of catalyst to be tested, a heating mantle having a central vertical opening therein slidably mounted on said press for vertical movement thereon between a lower position wherein said open-ended cylinder is enclosed within said opening of said heating mantle and an upper position above said open-ended cylinder, means for driving said movable press member downwardly against said second piston, means for measuring the temperature of the central portion of said open-ended cylinder, means for measuring the pressure exerted by said movable press member against said second piston, and means for measuring relative movement of said movable press member and said bed plate.

References Cited in the file of this patent

UNITED STATES PATENTS

| | | |
|---|---|---|
| 1,979,267 | Howe | Nov. 6, 1934 |
| 2,270,389 | Straub et al. | Jan. 20, 1942 |
| 2,279,368 | Dietert | Apr. 14, 1942 |
| 2,326,345 | Ernst et al. | Aug. 10, 1943 |